US010930283B2

(12) United States Patent
Lee et al.

(10) Patent No.: US 10,930,283 B2
(45) Date of Patent: Feb. 23, 2021

(54) SOUND RECOGNITION DEVICE AND SOUND RECOGNITION METHOD APPLIED THEREIN

(71) Applicant: Cheng Uei Precision Industry Co., Ltd., New Taipei (TW)

(72) Inventors: James Cheng Lee, New Taipei (TW); Kuo Yang Wu, New Taipei (TW); Hsin Chang Chen, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 174 days.

(21) Appl. No.: 16/420,305

(22) Filed: May 23, 2019

(65) Prior Publication Data

US 2020/0243079 A1 Jul. 30, 2020

(30) Foreign Application Priority Data

Jan. 28, 2019 (TW) .................................. 108103170

(51) Int. Cl.

| G10L 15/22 | (2006.01) |
|---|---|
| G10L 21/00 | (2013.01) |
| G10L 19/00 | (2013.01) |
| G10L 21/0232 | (2013.01) |
| G10L 25/24 | (2013.01) |
| H04R 1/40 | (2006.01) |
| G10L 15/19 | (2013.01) |
| G10L 15/06 | (2013.01) |

(Continued)

(52) U.S. Cl.
CPC ............ *G10L 15/22* (2013.01); *G10L 15/063* (2013.01); *G10L 15/19* (2013.01); *G10L 19/00* (2013.01); *G10L 21/0232* (2013.01); *G10L 25/24* (2013.01); *H04R 1/406* (2013.01); *G10L 2015/088* (2013.01); *G10L 2015/223* (2013.01); *G10L 2021/02082* (2013.01)

(58) Field of Classification Search
CPC ......... G10L 15/06; G10L 15/22; G10L 15/19; G10L 21/00; G10L 25/24; G10L 19/00
See application file for complete search history.

(56) References Cited

U.S. PATENT DOCUMENTS 9,558,749 B1 * 1/2017 Secker-Walker ....... G10L 17/06
10,623,246 B1 * 4/2020 Iyer ..................... H04L 12/2825
(Continued)

*Primary Examiner* — Shreyans A Patel
(74) *Attorney, Agent, or Firm* — Lin & Associates Intellectual Property, Inc.

(57) ABSTRACT

A sound recognition device includes a collecting module, an extracting module connected with the collecting module, a training module, a storage module, a decoding module and a processor module. The collecting module is for receiving sound information of a specific target and a target to be measured. The extracting module is used for extracting sound characteristics of the specific target and the target to be measured. The training module is connected with the extracting module. Regard the sound characteristics of the sound information of the specific target and the target to be measured as input data of a hidden vector state (HVS) model. The storage module is connected with the training module. The decoding module is used for proceeding a language decoding procedure on sound information of the target to be measured. The processor module is connected with the training module, the storage module and the decoding module.

12 Claims, 2 Drawing Sheets

(51) Int. Cl.
    *G10L 21/0208*        (2013.01)
    *G10L 15/08*          (2006.01)

(56)         References Cited

U.S. PATENT DOCUMENTS

2015/0302847 A1*  10/2015  Yun .................. G10L 15/02
                                              704/251
2016/0267913 A1*   9/2016  Kim ................. G10L 15/22
2017/0110123 A1*   4/2017  Sharifi ............. G06F 21/32
2017/0206895 A1*   7/2017  Tang .............. G10L 15/083
2018/0018973 A1*   1/2018  Moreno ........... G10L 17/24
2018/0293221 A1*  10/2018  Finkelstein ...... G06F 40/205
2019/0066680 A1*   2/2019  Woo ............... G10L 15/08
2019/0287526 A1*   9/2019  Ren ................ G10L 15/18
2020/0243079 A1*   7/2020  Lee ................ G10L 15/08

* cited by examiner

SOUND RECOGNITION DEVICE AND SOUND RECOGNITION METHOD APPLIED THEREIN

CROSS-REFERENCE TO RELATED APPLICATION

The present application is based on, and claims priority form, Taiwan Patent Application No. 108103170, filed Jan. 28, 2019, the disclosure of which is hereby incorporated by reference herein in its entirety.

BACKGROUND OF THE INVENTION

1. Field of the Invention

The present invention generally relates to a sound recognition field, and more particularly to a sound recognition device, and a sound recognition method applied therein.

2. The Related Art

In recent years, intelligent sound boxes gradually change lifestyles of people, intelligent sound boxes regarded as sound assistants are capable of assisting users to execute tasks, such as calling a taxi, shopping, reminding items, recording information and others. Though the intelligent sound boxes bring more conveniences to lives of the people, the intelligent sound boxes still have a lot of hidden safety hazards. Sometimes the intelligent sound boxes have no way of effectively distinguishing whether preset users order commodities by use of credit cards, so in order to prevent someone from using the credit cards to order the commodities through the intelligent sound boxes, many current intelligent sound boxes on the market will adopt a sound recognition way to be as safeguard measures.

A common intelligent sound box which is regarded as a sound recognition device, usually adopts a sound wakening way to waken the common intelligent sound box so as to execute following tasks, the sound wakening way is a way of automatically capturing some sound commands (wakening words) registered by some users from a continuous sound. Conventionally, the common intelligent sound box applies a hidden markov model (HMM) technology, a single phoneme or a syllabic feature vector is applied to proceed a comparison, a largest probability (most possible) word is found, later, the hidden markov model (HMM) technology is combined with a gaussian mixture model (GMM) technology to form a classical GMM-HMM technology. A current GMM-HMM technology usually adopts a maximum likelihood sound recognition method.

However, the above-mentioned sound recognition method easily makes a recognition probability of someone be larger than a recognition probability of the preset user under certain factors. Thereby a lower recognition accuracy of the sound recognition method of the sound recognition device is caused.

Thus, the sound recognition method still has an improvement space, so that an innovative sound recognition device and an innovative sound recognition method need be provided.

SUMMARY OF THE INVENTION

An object of the present invention is to provide a sound recognition method applied in a sound recognition device for wakening the sound recognition device by a specific target. Specific steps of the sound recognition method are described hereinafter. Receive sound information of the specific target, and preprocess the sound information of the specific target, extract a sound characteristic of the specific target. Regard sound characteristics of the specific target as input data of a hidden vector state (HVS) model based on a discriminative training, and the input data of the hidden vector state (HVS) model based on the discriminative training are trained to get a specific target acoustics model and store the specific target acoustics model. Receive sound information of a target to be measured, and preprocess the sound information of the target to be measured, extract a sound characteristic of the target to be measured. Regard sound characteristics of the target to be measured as the input data of the hidden vector state (HVS) model based on the discriminative training, and the input data of the hidden vector state (HVS) model based on the discriminative training are trained to get an acoustics model of the target to be measured. Compare the acoustics model of the target to be measured with the specific target acoustics model to judge whether the acoustics model of the target to be measured and the specific target acoustics model have a relevance or not, if the acoustics model of the target to be measured and the specific target acoustics model have the relevance, the sound characteristics of the sound information of the target to be measured use at least one language model to proceed a language decoding procedure, and judge whether the sound recognition device is wakened or not according to a language-decoded result of the sound information of the target to be measured.

Another object of the present invention is to provide a sound recognition device for being wakened by a specific target. The sound recognition device includes a collecting module, an extracting module, a training module, a storage module, a decoding module and a processor module. The collecting module is equipped with multiple microphones for receiving sound information of the specific target and a target to be measured. The sound information of the specific target and the target to be measured include at least one wakening word. The extracting module is connected with the collecting module. The extracting module is used for extracting mel-frequency cepstral coefficient sound characteristics of the specific target and the target to be measured. The training module is connected with the extracting module. Regard the mel-frequency cepstral coefficient sound characteristics of the sound information of the specific target and the target to be measured as input data of a hidden vector state (HVS) model based on a discriminative training, and the input data of the hidden vector state (HVS) model based on the discriminative training are trained to get a specific target acoustics model and an acoustics model of the target to be measured. The storage module is connected with the training module. The storage module is used for storing the specific target acoustics model trained by the training module. The decoding module is connected with the extracting module. The decoding module is used for proceeding a language decoding procedure on the sound information of the target to be measured. The processor module is connected with the training module, the storage module and the decoding module. The processor module is used for comparing the specific target acoustics model and the acoustics model of the target to be measured. Judge whether the decoding module is started to proceed the language decoding procedure according to a comparison result between the specific target acoustics model and the acoustics model of the target to be measured. The processor module judges whether the sound information of the target to be measured includes wakening words to waken the sound recognition device or not according to the acoustics model of the target to be measured and a language-decoded result of the sound information of the target to be measured.

Another object of the present invention is to provide a sound recognition device for being wakened by a specific target. The sound recognition device includes a collecting module, an extracting module, a training module, a storage module, a decoding module, a processor module, a register module and a wireless communication module. The collecting module is for receiving sound information of the specific target and a target to be measured. The sound information of the specific target and the target to be measured includes at least one wakening word. The extracting module is connected with the collecting module. The extracting module is used for extracting sound characteristics of the specific target and the target to be measured. The training module is connected with the extracting module. Regard the sound characteristics of the sound information of the specific target and the target to be measured as input data of a hidden vector state (HVS) model based on a discriminative training, and the input data of the hidden vector state (HVS) model based on the discriminative training are trained to get a specific target acoustics model and an acoustics model of the target to be measured. The storage module is connected with the training module. The storage module is used for storing the specific target acoustics model. The decoding module is connected with the extracting module. The decoding module is used for proceeding a language decoding procedure on the sound information of the target to be measured. The processor module is connected with the training module, the storage module and the decoding module. The processor module is used for comparing the specific target acoustics model and the acoustics model of the target to be measured. Judge whether the decoding module is started to proceed the language decoding procedure according to a comparison result between the specific target acoustics model and the acoustics model of the target to be measured. The processor module judge whether the sound information of the target to be measured includes wakening words to waken the sound recognition device or not according to the acoustics model of the target to be measured and a language-decoded result of the sound information of the target to be measured. The register module is connected with the collecting module and the storage module. The register module is used for registering the specific target. The wireless communication module is used for proceeding being connected and communicated with an outside.

As described above, the sound recognition method is used for wakening the sound recognition device by the specific target, and the sound recognition device adopts the hidden vector state (HVS) model based on the discriminative training to be the acoustics model, and the discriminative training is proceeded according to a rule of a maximum mutual information method, an appearance probability of an accurate answer is capable of being enhanced and maximized, and an appearance probability of an inaccurate answer of the competitor is effectively lowered, so a performance of discriminating the accurate answer of the specific target from the inaccurate answer of the competitor is increased. As a result, the target to be measured is quickly and accurately judged to be the specific target so as to reach a sound-recognition wakening effect of the sound recognition device.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
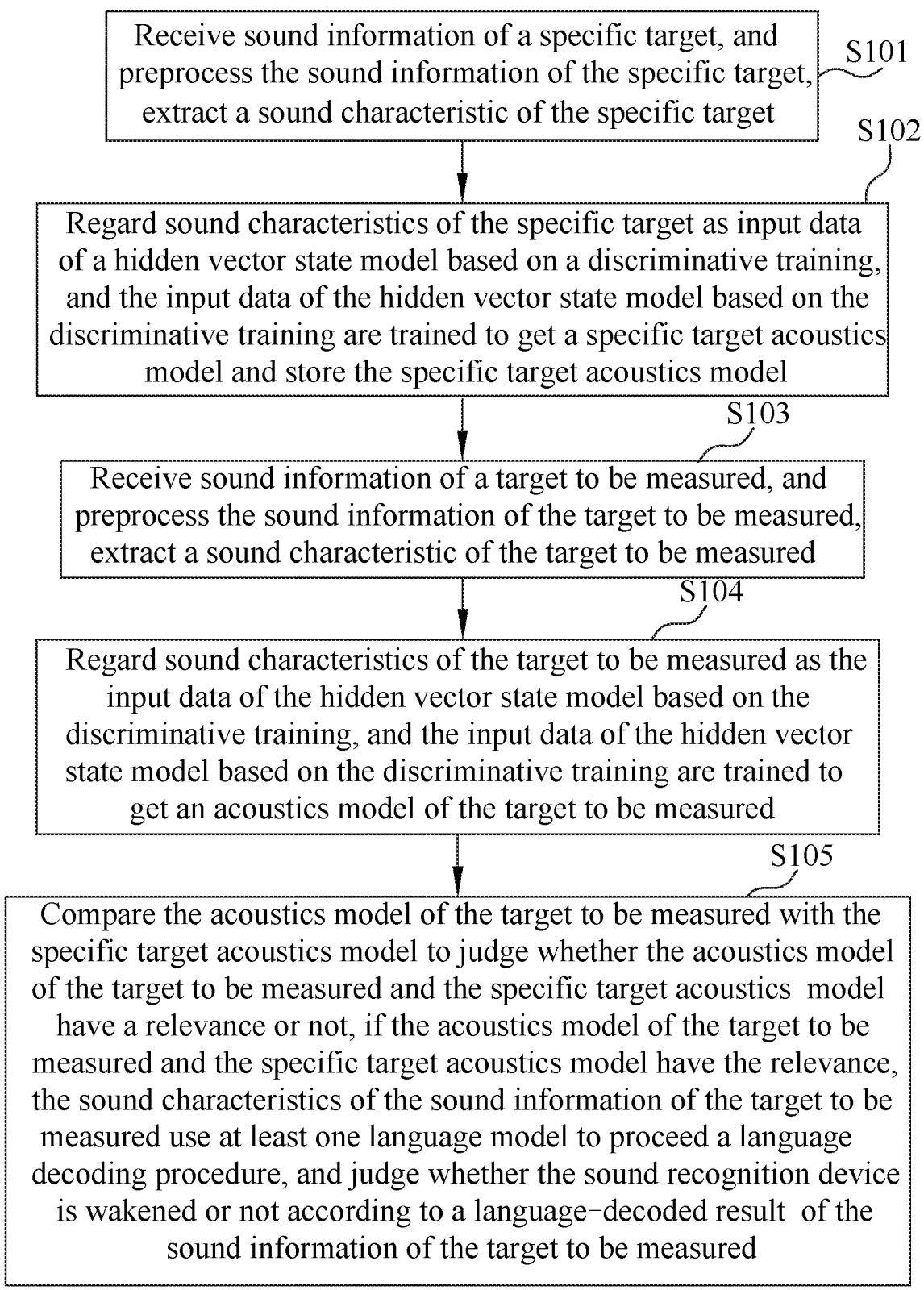
FIG. 1 is a flow chart of a sound recognition method applied in a sound recognition device in accordance with a preferred embodiment of the present invention.
Figure 2:
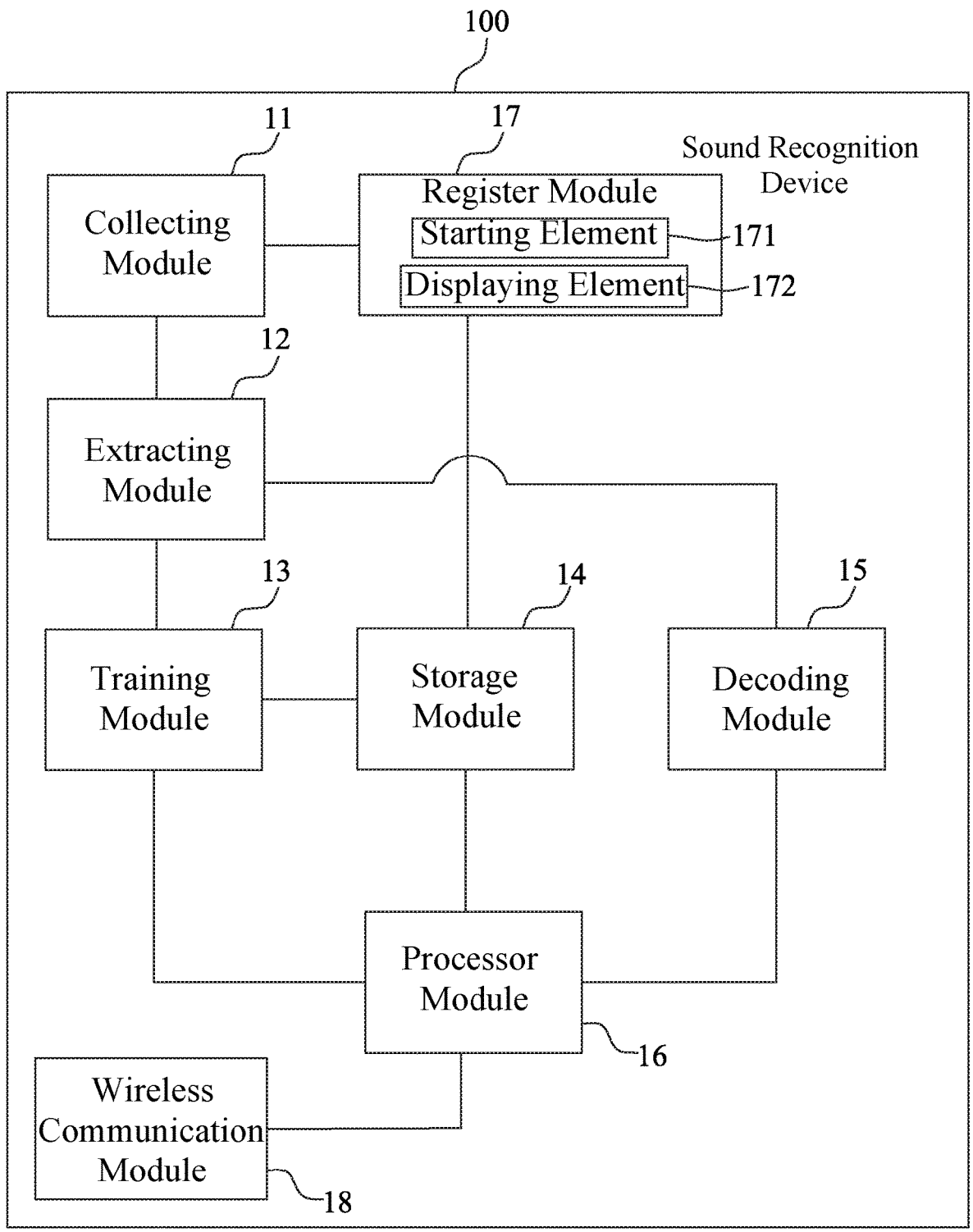
FIG. 2 is a block diagram of the sound recognition device in accordance with the preferred embodiment of the present invention.

With reference to FIG. 1 to FIG. 2, a sound recognition device 100 applying a sound recognition method in accordance with a preferred embodiment of the present invention is shown. The sound recognition method is applied in the sound recognition device 100 for wakening the sound recognition device 100 by a specific target. A flow chart of the sound recognition method applied in the sound recognition device 100 according to the preferred embodiment of the present invention is shown in FIG. 1. Specific steps of the sound recognition method are described as follows.

Step S101: receive sound information of the specific target, and preprocess the sound information of the specific target, extract a sound characteristic of the specific target.

Specifically, in the step S101, the specific target indicates a registered user reaching a wakening condition in a sound recognition process, the sound information is a content of a prepared text read by the specific target, the content of the prepared text includes a preset wakening word, the specific target reads the content of the prepared text in advance, and collects the sound information of the specific target through a collecting module 11 of the sound recognition device 100 in accordance with the preferred embodiment of the present invention.

Specifically, in the step S101, the collected sound information is analog sound signals. The analog sound signals need be converted into digital sound signals so as to proceed a subsequent sound recognition processing procedures. In addition, the sound information may further includes other environmental noises, so the sound information need be preprocessed to eliminate useless environmental noises and acquire effective sound signals. Preprocessed procedures include a noise inhibition processing procedure and an echo elimination processing procedure on the digital sound signals. The above-mentioned preprocessed procedures are capable of being executed with reference to a current existing noise suppression technology.

Specifically, sound characteristics of the specific target need be extracted from the sound information which completes being preprocessed, in the preferred embodiment, the sound characteristics of the specific target are captured by adopting a mel-frequency cepstral coefficient (MFCC) way. The preprocessed sound information are cut into multiple audio frames. A part of the audio frames of the preprocessed sound information need be emphasized proceed being pre-emphasised, windowing and other operations to get more distinct and more explicit sound characteristics.

Step S102: regard the mel-frequency cepstral coefficient sound characteristics of the sound information of the specific target as input data of a hidden vector state (HVS) model based on a discriminative training, and the input data of the hidden vector state (HVS) model based on the discriminative training are trained to get a specific target acoustics model and store the specific target acoustics model.

Specifically, in the step S102, the sound characteristics of the specific target are regarded as the input data of the hidden vector state (HVS) model to proceed a first acoustic model training, in the preferred embodiment, the first acoustic model training is proceeded by way of adopting the hidden vector state (HVS) model and using the discriminative training. The discriminative training is without regarding maximizing a similarity of training sound linguistic data as a goal, minimizing a classification (or recognition) mistake is regarded as the goal for increasing a recognition rate.

The discriminative training is proceeded according to a rule of a maximum mutual information (MMI) method, an appearance probability of an accurate answer is capable of being enhanced and maximized, an appearance probability of an inaccurate answer of a competitor is effectively lowered, so a performance of discriminating the accurate answer of the specific target from the inaccurate answer of the competitor is increased.

Specifically, in the step S102, store the specific target acoustics model in a storage module 14 of the sound recognition device 100.

Step S103: receive sound information of a target to be measured, and preprocess the sound information of the target to be measured, extract a sound characteristic of the target to be measured.

Specifically, in the step S103, the target to be measured indicates a person who uses the sound recognition device 100 and will proceed a sound recognition comparison through the sound recognition device 100, the target to be measured outputs the sound information, and the sound information of the target to be measured is collected by the collecting module 11 of the sound recognition device 100.

Specifically, in the step S103, proceed preprocessing the sound information of the target to be measured, extract the sound characteristic of the target to be measured, and procedures of proceeding preprocessing the sound information of the target to be measured are the same as abovementioned procedures of preprocessing the sound information of the specific target, and a procedure of extracting the sound characteristic of the target to be measured is the same as an above-mentioned procedure of extracting the sound characteristic of the specific target.

Step S104: regard mel-frequency cepstral coefficient sound characteristics of the sound information of the target to be measured as the input data of the hidden vector state (HVS) model based on the discriminative training, and the input data of the HVS model based on the discriminative training are trained to get an acoustics model of the target to be measured.

Specifically, in the step S104, the sound characteristics of the target to be measured are regarded as the input data of the hidden vector state (HVS) model to proceed a second acoustic model training, in the preferred embodiment, the second acoustic model training is proceeded by way of adopting the hidden vector state (HVS) model and using the discriminative training. The discriminative training is proceeded according to the rule of maximum mutual information (MMI) method.

Step S105: compare the acoustics model of the target to be measured with the specific target acoustics model to judge whether the acoustics model of the target to be measured and the specific target acoustics model have a relevance or not, if the acoustics model of the target to be measured and the specific target acoustics model have the relevance, the sound characteristics of the sound information of the target to be measured use at least one language model to proceed a language decoding procedure, and judge whether the sound recognition device 100 is wakened or not according to a language-decoded result of the sound information of the target to be measured.

Specifically, in the step S105, when the acoustics model of the target to be measured conforms to the specific target acoustics model, the language decoding procedure is proceeded. If the acoustics model of the target to be measured is without conforming to the specific target acoustics model, any action is without being proceeded. The language decoding procedure uses the sound characteristics of the target to be measured as input information to proceed a language model training, in the preferred embodiment, a language model includes a word library model, a grammar model, or a combination of the word library model and the grammar model.

When the acoustics model of the target to be measured is judged to be the specific target acoustics model, at the moment, the target to be measured is the specific target, so proceed the language decoding procedure to confirm whether the sound information of the target to be measured includes wakening words or not. The sound characteristics of the target to be measured proceed a word library model training and a grammar model training to get a sound information content of the target to be measured by an analysis, and then judge whether the sound information content of the target to be measured includes the wakening words or not, if the sound information content of the target to be measured includes the wakening words, a sound-recognition wakening instruction is started, if the sound information content of the target to be measured is without including the wakening words, the sound-recognition wakening instruction is without being started.

A step of judging whether the sound recognition device 100 is wakened or not according to the language decoding result includes following steps. Proceed the language decoding procedure on the sound characteristics of the target to be measured. Judge whether the sound information content of the target to be measured includes the wakening words or not, if the sound information content of the target to be measured includes the wakening words, the sound-recognition wakening instruction is started, if the sound information content of the target to be measured is without including the wakening words, the sound-recognition wakening instruction is without being started.

Referring to FIG. 2, the sound recognition device 100 for being wakened by the specific target, includes the collecting module 11, an extracting module 12, a training module 13, a storage module 14, a decoding module 15, a processor module 16, a register module 17 and a wireless communication module 18.

The collecting module 11 is connected with the extracting module 12 and the register module 17. The collecting module 11 is equipped with multiple microphones for receiving the sound information of the specific target and the target to be measured. The collected sound information is the analog sound signals, the analog sound signals need be converted into digital sound signals, and simultaneously, proceed the noise inhibition processing procedure and the echo elimination processing procedure on the digital sound signals, and then the processed digital sound signals are transmitted to the extracting module 12.

A definition of the specific target is a specific object for wakening the sound recognition device 100, and a definition of the target to be measured is an object on which the sound recognition device 100 proceeds a sound recognition.

The sound information of the specific target includes the preset wakening word. The sound information of the specific target and the target to be measured includes at least one wakening word.

The extracting module 12 is connected with the collecting module 11, the training module 13 and the decoding module 15. The extracting module 12 is used for receiving the sound information processed by the collecting module 11 and extracting mel-frequency cepstral coefficients (MFCC) sound characteristics of the specific target and the target to be measured from the collecting module 11, and then the sound characteristics of the specific target and the target to be measured are transmitted to the training module 13 to proceed an acoustics model training or transmitted to the decoding module 15 to proceed being decoded.

The sound characteristics of the sound information of the specific target and the target to be measured are extracted and captured by a mel-frequency cepstral coefficients (MFCC) way.

The training module 13 is connected with the extracting module 12, the storage module 14 and the processor module 16. The training module 13 is used for receiving the sound characteristics of the specific target and the target to be measured extracted by the extracting module 12, and the sound characteristics of the specific target and the target to be measured are regarded as the input data of the hidden vector state (HVS) model based on the discriminative training which is trained by virtue of the maximum mutual information (MMI) method. At last a trained acoustics model is acquired, and proceed different steps according to the specific target and the target to be measured. If the specific target is recognized, the specific target acoustics model is transmitted to the storage module 14, if the target to be measured is recognized, the acoustics model of the target to be measured is transmitted to the processor module 16.

The storage module 14 is connected with the training module 13, the processor module 16 and the register module 17. The storage module 14 is used for storing the specific target acoustics model trained by the training module 13. In the preferred embodiment, when the specific target proceeds an operation of the register module 17, the specific target acoustics model trained by the training module 13 will be transmitted to the storage module 14 to be stored. In addition, when the processor module 16 proceeds a comparison between the acoustics model of the target to be measured and the specific target acoustics model, the storage module 14 transmits the stored specific target acoustics model to the processor module 16.

The decoding module 15 is connected with the extracting module 12 and the processor module 16. The decoding module 15 is used for proceeding the language decoding procedure on the sound information of the target to be measured, more specifically, the extracting module 12 regards the sound characteristics of the target to be measured as input data based on the word library model and the grammar module to be trained, and a result of training the input data based on the word library model and the grammar module is transmitted to the processor module 16.

The processor module 16 is connected with the training module 13, the storage module 14, the decoding module 15 and the wireless communication module 18. The processor module 16 is used for comparing the specific target acoustics model and the acoustics model of the target to be measured. Judge whether the decoding module 15 is started to proceed the language decoding procedure according to a comparison result between the specific target acoustics model and the acoustics model of the target to be measured, and more specifically, the training module 13 transmits the acoustics model of the target to be measured, the processor module 16 simultaneously gets the specific target acoustics model from the storage module 14, and proceed comparing the specific target acoustics model with the acoustics model of the target to be measured in the processor module 16.

When the specific target acoustics model and the acoustics model of the target to be measured are confirmed to have the relevance, namely, the target to be measured is the specific target, so the language decoding procedure of the sound information of the target to be measured is proceeded to judge whether the wakening word is included or not, so the processor module 16 will start the decoding module 15, and the decoding module 15 proceeds the language decoding procedure.

The decoding module 15 acquires the sound characteristics of the target to be measured from the extracting module 12, and an operation result of the language decoding procedure is transmitted back to the processor module 16, the processor module 16 judges whether the sound information of the target to be measured includes the wakening words to waken the sound recognition device 100 or not according to the acoustics model of the target to be measured and the language-decoded result of the sound information of the target to be measured.

When the processor module 16 gets the sound information of the target to be measured which includes the wakening words, execute the sound-recognition wakening instruction of the sound recognition device 100, on the contrary, the sound-recognition wakening instruction of the sound recognition device 100 is without being executed.

The register module 17 is connected with the collecting module 11 and the storage module 14. The register module 17 is used for registering the specific target of the sound recognition device 100, the register module 17 includes a starting element 171 and a displaying element 172. When the specific target touches the starting element 171, and the storage module 14 is simultaneously started, and the specific target acoustics model trained by the training module 13 need be stored in the storage module 14. In addition, when the specific target touches the starting element 171, the displaying element 172 is started to confirm whether the specific target is in a registered stage currently.

In the preferred embodiment, the starting element 171 is a button, and the displaying element 172 is a light-emitting diode.

The wireless communication module 18 is connected with the processor module 16. After the processor module 16 confirms to waken the sound recognition device 100 successfully, the wireless communication module 18 is used for proceeding being connected and communicated with an outside by virtue of the wireless communication module 18 being connected with a communication device (not shown).

In the preferred embodiment, the wireless communication module 18 includes a WiFi module or a bluetooth module.

In the preferred embodiment, the sound recognition device 100 is an intelligent sound box.

As described above, the sound recognition method is used for wakening the sound recognition device 100 by the specific target, and the sound recognition device 100 adopts the hidden vector state (HVS) model based on the discriminative training to be the acoustics model, and the discriminative training is proceeded according to the rule of the maximum mutual information (MMI) method, the appearance probability of the accurate answer is capable of being enhanced and maximized, and the appearance probability of the inaccurate answer of the competitor is effectively lowered, so the performance of discriminating the accurate answer of the specific target from the inaccurate answer of the competitor is increased. As a result, the target to be measured is quickly and accurately judged to be the specific target so as to reach a sound-recognition wakening effect of the sound recognition device 100.

What is claimed is:

1. A sound recognition method applied in a sound recognition device for wakening the sound recognition device by a specific target, comprising steps of:
   receiving sound information of the specific target, and preprocessing the sound information of the specific target, extracting a sound characteristic of the specific target;
   regarding sound characteristics of the specific target as input data of a hidden vector state (HVS) model based on a discriminative training, and the input data of the hidden vector state (HVS) model based on the discriminative training being trained to get a specific target acoustics model and storing the specific target acoustics model;
   receiving sound information of a target to be measured, and preprocessing the sound information of the target to be measured, extracting a sound characteristic of the target to be measured;
   regarding sound characteristics of the target to be measured as the input data of the hidden vector state (HVS) model based on the discriminative training, and the input data of the hidden vector state (HVS) model based on the discriminative training being trained to get an acoustics model of the target to be measured; and
   comparing the acoustics model of the target to be measured with the specific target acoustics model to judge whether the acoustics model of the target to be measured and the specific target acoustics model have a relevance or not, if the acoustics model of the target to be measured and the specific target acoustics model have the relevance, the sound characteristics of the sound information of the target to be measured using at least one language model to proceed a language decoding procedure, and judging whether the sound recognition device is wakened or not according to a language-decoded result of the sound information of the target to be measured.

2. The sound recognition method as claimed in claim 1, wherein the sound information of the specific target and the target to be measured includes at least one wakening word.

3. The sound recognition method as claimed in claim 1, wherein preprocessed procedures include a noise inhibition processing procedure and an echo elimination processing procedure.

4. The sound recognition method as claimed in claim 1, wherein the sound characteristics of the specific target are captured by adopting a mel-frequency cepstral coefficients way.

5. The sound recognition method as claimed in claim 1, wherein the discriminative training is proceeded according to a rule of a maximum mutual information method.

6. The sound recognition method as claimed in claim 1, wherein the language model includes a word library model, a grammar model, or a combination of the word library model and the grammar model.

7. The sound recognition method as claimed in claim 2, wherein the step of judging whether the sound recognition device is wakened or not according to a language decoding result includes following steps, proceed the language decoding procedure on the sound characteristics of the target to be measured, judge whether a sound information content of the target to be measured includes the wakening words or not, if the sound information content of the target to be measured includes the wakening words, a sound-recognition wakening instruction is started, if the sound information content of the target to be measured is without including the wakening words, the sound-recognition wakening instruction is without being started.

8. A sound recognition device for being wakened by a specific target, comprising:
   a collecting module equipped with multiple microphones for receiving sound information of the specific target and a target to be measured, the sound information of the specific target and the target to be measured including at least one wakening word;
   an extracting module connected with the collecting module, the extracting module being used for extracting mel-frequency cepstral coefficient sound characteristics of the specific target and the target to be measured;
   a training module connected with the extracting module, regarding the mel-frequency cepstral coefficient sound characteristics of the sound information of the specific target and the target to be measured as input data of a hidden vector state (HVS) model based on a discriminative training, and the input data of the hidden vector state (HVS) model based on the discriminative training being trained to get a specific target acoustics model and an acoustics model of the target to be measured;
   a storage module connected with the training module, the storage module being used for storing the specific target acoustics model trained by the training module;
   a decoding module connected with the extracting module, the decoding module being used for proceeding a language decoding procedure on the sound information of the target to be measured; and
   a processor module connected with the training module, the storage module and the decoding module, the processor module being used for comparing the specific target acoustics model and the acoustics model of the target to be measured, judging whether the decoding module is started to proceed the language decoding procedure according to a comparison result between the specific target acoustics model and the acoustics model of the target to be measured, the processor module judging whether the sound information of the target to be measured includes wakening words to waken the sound recognition device or not according to the acoustics model of the target to be measured and a language-decoded result of the sound information of the target to be measured.

9. The sound recognition device as claimed in claim 8, further comprising a register module connected with the collecting module and the storage module, the register module being used for registering the specific target.

10. The sound recognition device as claimed in claim 9, wherein the register module includes a starting element and a displaying element, when the specific target touches the starting element, the storage module is simultaneously started, and the specific target acoustics model trained by the training module need be stored in the storage module.

11. The sound recognition device as claimed in claim 8, further comprising a wireless communication module used for proceeding being connected and communicated with an outside.

12. A sound recognition device for being wakened by a specific target, comprising:
   a collecting module for receiving sound information of the specific target and a target to be measured, the sound information of the specific target and the target to be measured including at least one wakening word;

an extracting module connected with the collecting module, the extracting module being used for extracting sound characteristics of the specific target and the target to be measured;

a training module connected with the extracting module, regarding the sound characteristics of the sound information of the specific target and the target to be measured as input data of a hidden vector state (HVS) model based on a discriminative training, and the input data of the hidden vector state (HVS) model based on the discriminative training being trained to get a specific target acoustics model and an acoustics model of the target to be measured;

a storage module connected with the training module, the storage module being used for storing the specific target acoustics model;

a decoding module connected with the extracting module, the decoding module being used for proceeding a language decoding procedure on the sound information of the target to be measured;

a processor module connected with the training module, the storage module and the decoding module, the processor module being used for comparing the specific target acoustics model and the acoustics model of the target to be measured, judging whether the decoding module is started to proceed the language decoding procedure according to a comparison result between the specific target acoustics model and the acoustics model of the target to be measured, the processor module judging whether the sound information of the target to be measured includes wakening words to waken the sound recognition device or not according to the acoustics model of the target to be measured and a language-decoded result of the sound information of the target to be measured;

a register module connected with the collecting module and the storage module, the register module being used for registering the specific target; and a wireless communication module used for proceeding being connected and communicated with an outside.

* * * * *